United States Patent Office 2,947,106
Patented Aug. 2, 1960

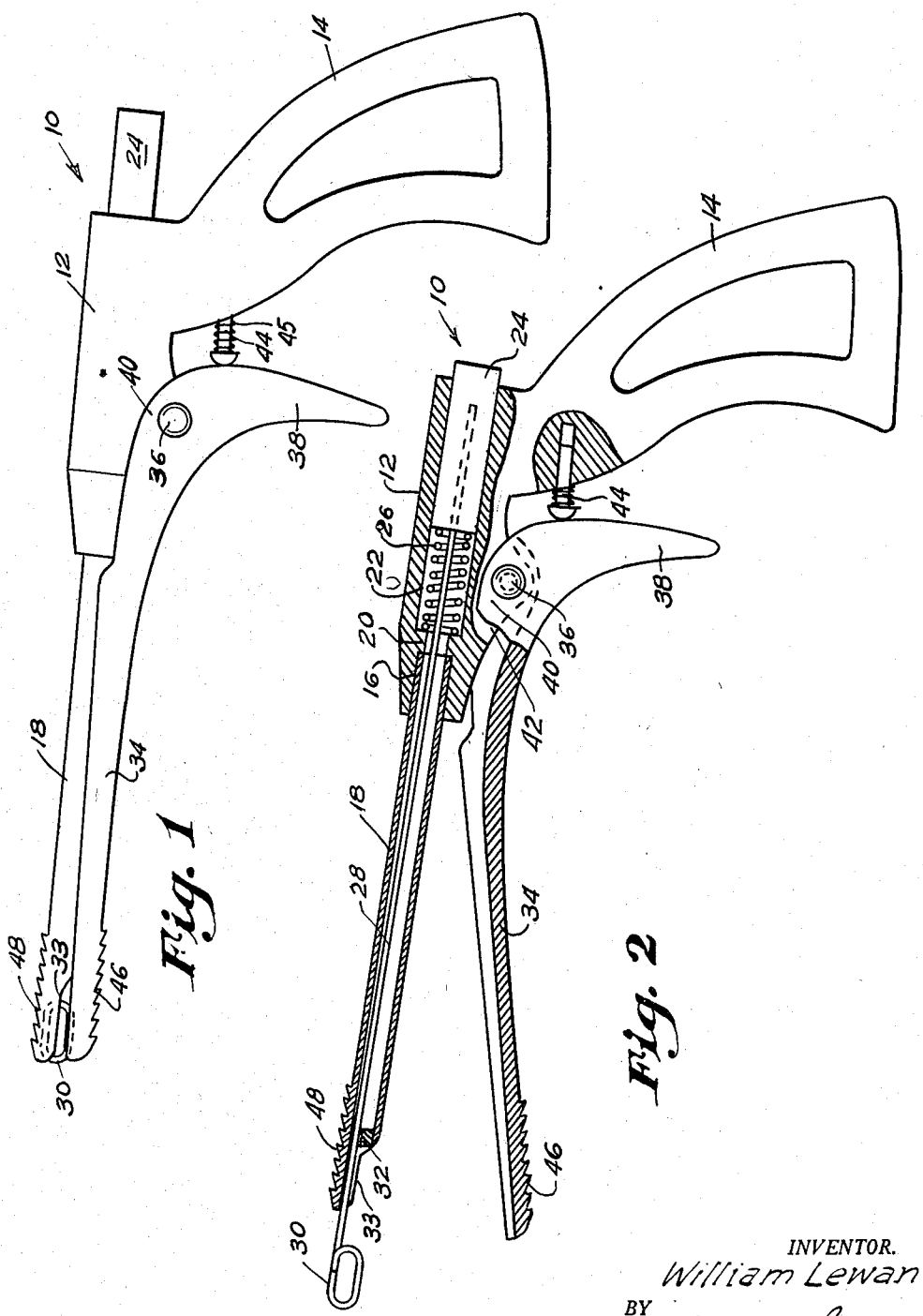

2,947,106

FISH HOOK REMOVERS

William Lewan, 2464 S. 92nd St., West Allis, Wis.

Filed Nov. 18, 1957, Ser. No. 697,170

4 Claims. (Cl. 43—53.5)

This invention relates to fishing accessories and more particularly to a fish hook remover which may be actuated to remove a hook from the mouth of a fish without the necessity of handling the fish.

Many people who might otherwise be ardent fishermen refrain from the sport because they do not like to handle the fish with their hands, and in particular they do not like to remove the hook from the mouth of the fish. The aversion to removing the hook is due primarily to a fear of being bitten by the fish.

An object of the present invention is to provide a fish hook remover which will remove the hook from the mouth or throat of a fish without the necessity of handling the fish.

Another object is to provide a fish hook remover which will be simple to operate and economical to manufacture.

A further object of the invention is to provide a fish hook remover which will hold the fish's mouth open while removing the hook.

A still further object is to provide a fish hook remover which will hold the mouth of a fish open while the hook is being removed and which will release readily thereafter.

Still further objects will become apparent upon considering the following specification, which, when taken in conjunction with the accompanying drawings, illustrates a preferred form of the invention.

In the drawings:

Fig. 1 is a side elevational view of a fish hook remover, embodying the present invention, with the fish holding tongs in their normal or inactive position; and Fig. 2 is a side elevational view, partly in cross-section, of the hook remover shown in Fig. 1, but with the holding tongs in operative position.

Referring to the drawings, the fish hook remover preferably is made of aluminum or other metal that is inexpensive to cast or stamp.

The remover is made, generally, in the shape of a pistol and is built on a butt 10 which may comprise an upper straight portion 12 on which is formed a pistol-like grip 14.

The straight portion 12 of the butt is provided with three distinct bores. Of these bores, the forward bore 16 receives the rear end of a barrel 18 which seats against a shoulder formed by a somewhat smaller bore 20. The third bore 22 receives a plunger 24 which is urged rearwardly by a spring 26.

The plunger 24 is cylindrical in shape and has a rod 28 secured thereto. The rod 28 passes through the three bores 16, 20 and 22 and through the interior of the tubular barrel 18 and terminates in an open loop 30.

The rod 28 is held adjacent the top of the aperture in the barrel by a spacer block 32 so that the rod 28, at its outer end lies adjacent the top side of the barrel 18 and the loop retracts back into a cut away end part 33 of the barrel.

A gripper arm 34, having an upper concave surface to conform with the barrel 18, is connected to the butt 12 by a rivet 36. The rivet 36 passes through a pair of ears 40 formed on the gripper arm and through a lug 42 formed on the lower edge of the butt 10 and provides a pivotal connection between the butt and the gripper arm 34.

The gripper arm 34 is provided with a trigger-like actuator 38 to open the gripper arm 34 relative to the barrel 18.

A spring pressed plunger 44 is carried in an aperture in the hand grip 14 and bears against the rear side of the trigger member 38 to retain the gripper arm 34 normally against the barrel 18.

The under side of the gripper arm 34 and the upper side of the barrel 18 are provided with deep serrations 46—48, respectively, to grip the fish and retain the mouth of the fish open during removal of the hook.

*Operation*

In operation, when a fish is caught it is suspended by the line and the line threaded through the opening in the end of the loop 30.

With the loop retracted to the position shown in Fig. 1, the hook remover is run down the fish line until the loop 30 engages the fish hook. At this point the serrated end 46—48 of the remover is in the mouth of the fish.

The trigger 38 may then be pressed spreading the fish's mouth open, the serrations gripping the interior of the mouth to support the fish as the fisherman or operator releases tension on the fish line.

With the fish supported entirely between the serrated ends 46—48, the plunger 24 is pressed in by the thumb to force the loop 30 against the hook to remove it from the fish's flesh.

When the hook is free a slight tension is placed on the line and the plunger 24 released. As the loop 30 moves rearwardly, it moves into the cut-out portion 33 of the barrel 18, and the hook assumes a position between the serrated end 46 of the gripper 34 and the serrated end 48 of the barrel 18 (see Fig. 1).

The trigger is then released freeing the fish and allowing it to drop into the bottom of the boat.

It will thus be obvious that the present hook remover provides a means to remove the hook from the mouth of a fish without the necessity of touching the hooked fish, and without placing one's hand in proximity to the teeth of the fish.

It will be apparent that the hereinbefore described form of the invention is to be taken merely as a preferred embodiment thereof and that various changes in size, shape and arrangement of parts may be made without departing from the spirit of the invention or the scope of the sub-joined claims.

That which is claimed as new and is desired to be secured by United States Letters Patent is:

1. A substantially pistol shaped fish hook remover including a hollow barrel having a muzzle end and a butt portion used in conjunction with a hook having a line connected thereto, a first serrated element formed on the upper side of the barrel adjacent the muzzle end thereof, a lever member of substantially the same length as the barrel including a trigger shaped actuator pivotally connected to the butt portion adjacent the barrel, a second serrated element formed on the lower side of said lever member adjacent the muzzle end of the barrel, said serrated elements being movable apart to grip the interior of the fish's mouth by pressure on the trigger, a loop element slidably mounted within said barrel to receive the fish line which guides the loop into contact with the fish hook which it engages, and resilient means at the butt end of the pistol shaped member to propel the hook engaging end of the loop element in a direction towards the serrated elements and remove the hook from the mouth of the fish when said means is moved from a cocked position to released position.

2. A substantially pistol shaped fish hook remover including a hollow barrel having a muzzle end and a butt portion used in conjunction with a hook having a line connected thereto, a first serrated element formed on the upper side of the barrel adjacent the muzzle end thereof, a lever member of substantially the same length as the barrel including a trigger shaped actuator pivotally connected to the butt portion adjacent the barrel, a second serrated element formed on the lower side of said lever member adjacent the muzzle end of the barrel, said serrated elements being movable apart to grip the interior of the fish's mouth by pressure on the trigger, resilient means urging said lever into close relationship with said barrel, a loop shaped element slidably mounted within said barrel to receive the fish line which guides the loop into contact with the fish hook, and resilient means at the butt end of the pistol shaped member to propel the hook engaging end of the loop and remove the hook from the mouth of the fish.

3. A substantially pistol shaped fish hook remover including a hollow barrel having a muzzle end and a butt portion used in conjunction with a hook having a line connected thereto, a first serrated element formed on the upper side of the barrel adjacent the muzzle end thereof, a lever member of substantially the same length as the barrel including a trigger shaped actuator pivotally connected to the butt portion adjacent the barrel, a second serrated element formed on the lower side of said lever member adjacent the muzzle end of the barrel, said serrated elements being movable apart to grip the interior of the fish's mouth by pressure on the trigger, a loop element slidably mounted within said barrel to receive the fish line which guides the loop into contact with the fish hook which it engages, means to resiliently retain said loop in retracted position, and resilient means at the butt end of the pistol shaped member to propel the hook engaging end of the loop and remove the hook from the mouth of the fish.

4. A substantially pistol shaped fish hook remover including a hollow barrel having a muzzle end and a butt portion used in conjunction with a hook having a line connected thereto, a first serrated element formed on the upper side of the barrel adjacent the muzzle end thereof, a lever member of substantially the same length as the barrel including a trigger shaped actuator pivotally connected to the butt portion adjacent the barrel, a second serrated element formed on the lower side of said lever member adjacent the muzzle end of the barrel, said serrated elements being movable apart to grip the interior of the fish's mouth by pressure on the trigger, resilient means urging said lever into closed relationship with said barrel, a loop element slidably mounted within said barrel to receive the fish line which guides the loop into contact with the fish hook which it engages, means to resiliently retain said loop in a retracted position, and means at the butt end of the pistol shaped member to propel the hook engaging end of the loop and remove the hook from the mouth of the fish.

References Cited in the file of this patent

UNITED STATES PATENTS

| | | |
|---|---|---|
| 726,704 | Kohlhaas | Apr. 25, 1903 |
| 2,294,758 | Manske | Sept. 1, 1942 |
| 2,595,989 | Smeltz | May 6, 1952 |
| 2,603,829 | Siskoff | July 22, 1952 |
| 2,688,816 | Bondesen | Sept. 14, 1954 |
| 2,785,501 | Nicholsen | Mar. 19, 1957 |